Figure 1:
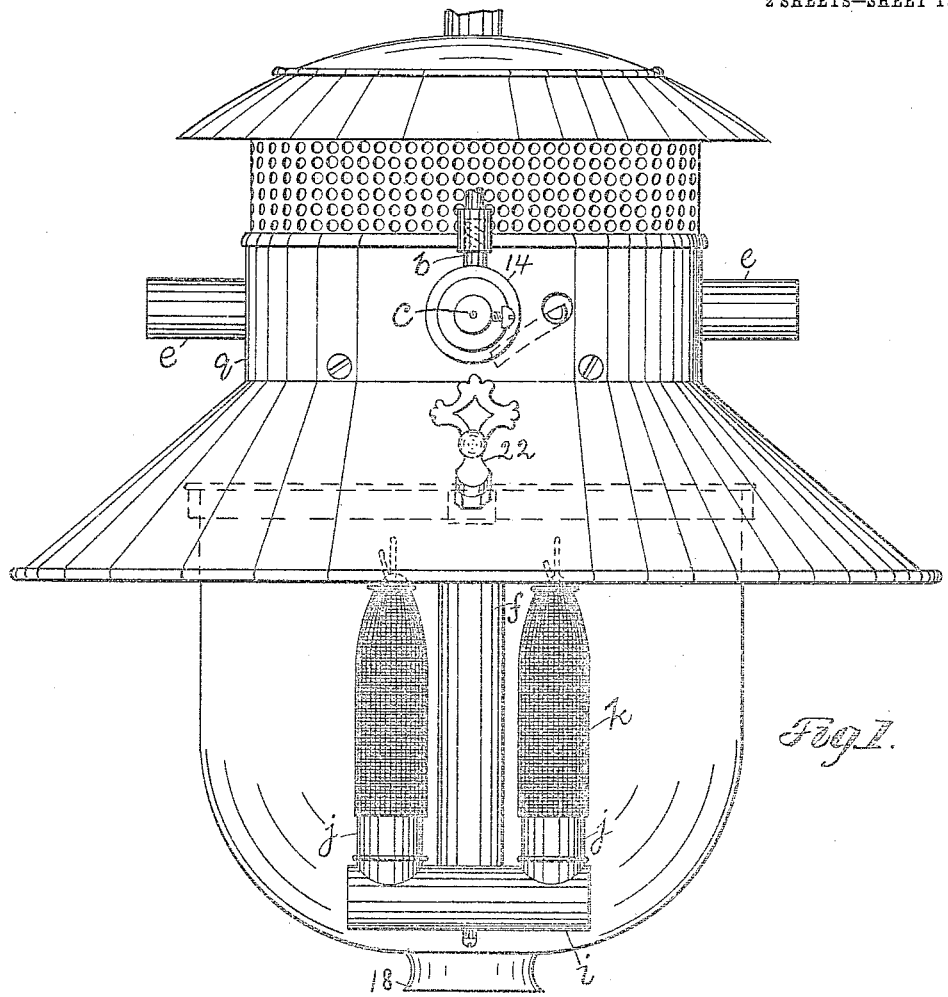

A. O. BRADFORD.
HYDROCARBON BURNER.
APPLICATION FILED AUG. 19, 1904.

953,685.

Patented Apr. 5, 1910.
2 SHEETS—SHEET 1.

Witnesses.
Inventor.
Alexander O. Bradford
by Jas. H. Churchill
atty.

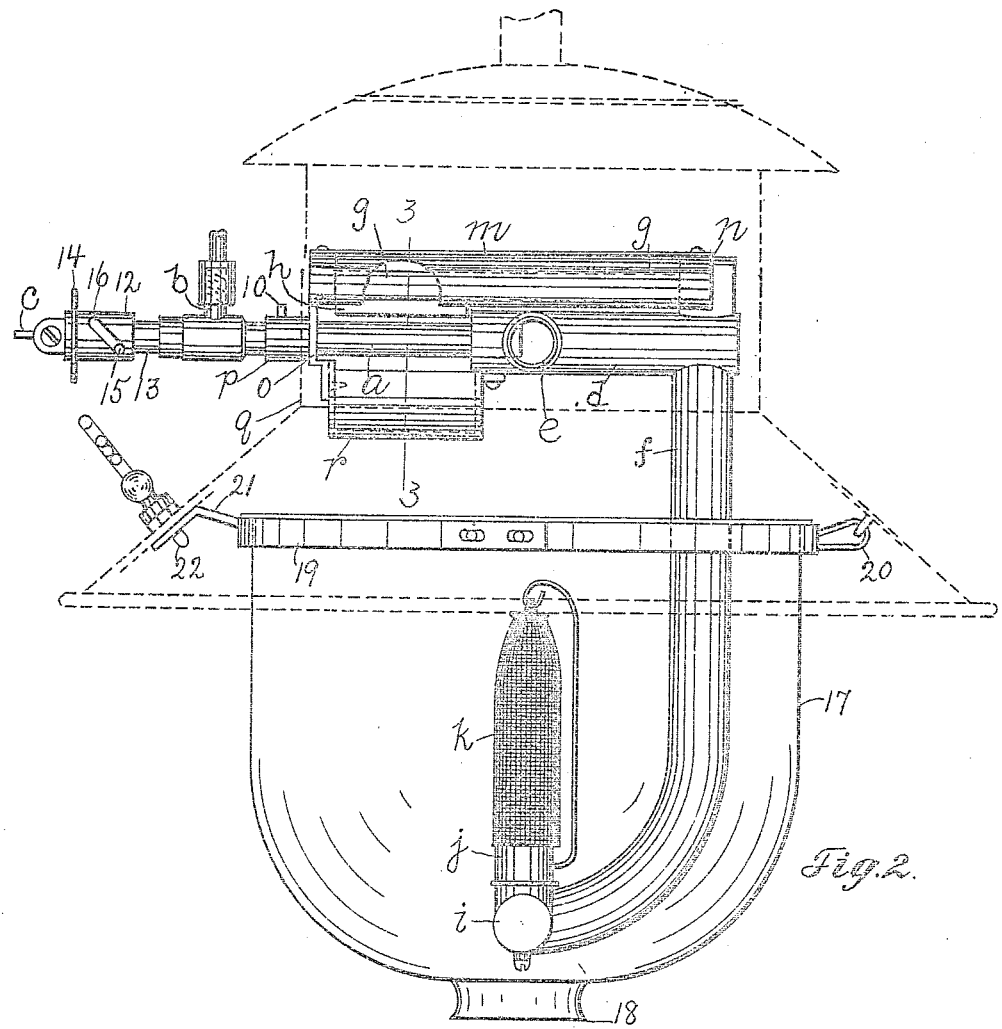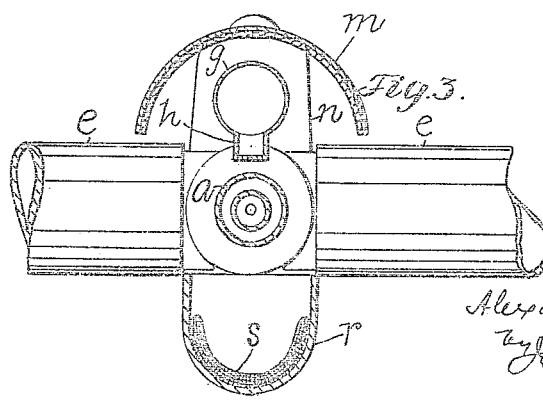

UNITED STATES PATENT OFFICE.

ALEXANDER O. BRADFORD, OF BOSTON, MASSACHUSETTS.

HYDROCARBON-BURNER.

953,685.  Specification of Letters Patent.  Patented Apr. 5, 1910.

Application filed August 19, 1904. Serial No. 221,351.

*To all whom it may concern:*

Be it known that I, ALEXANDER O. BRADFORD, a citizen of the United States, residing in Boston, in the county of Suffolk and State of Massachusetts, have invented an Improvement in Hydrocarbon-Burners, of which the following description, in connection with the accompanying drawings, is a specification, like characters on the drawings representing like parts.

This invention relates to a hydrocarbon burner especially designed and adapted among other uses, to be employed in lamps of the class known as oil arc lamps.

The present invention has for its object to provide a burner of increased efficiency and one in which kerosene and like oils may be vaporized with a minimum deposition of carbon, thereby reducing to a minimum the troubles and inconveniences from this source. For this purpose, I employ a vaporizer tube which is arranged in a substantially horizontal position and which discharges its vapor into a substantially horizontal mixing chamber, from which latter leads a vapor outlet for the main burner, and an auxiliary vapor outlet for an auxiliary or heating burner. The main burner is located out of line with the vaporizer and substantially in line with the air supply tubes for the mixing chamber, whereby the air may be substantially highly heated before being mixed with the vapor in said mixing chamber, and whereby the vaporizer is removed from the heating zone of the main burner a sufficient distance to prevent excessive heating of said vaporizer, thereby preventing or at least reducing to a minimum deposition of carbon within said vaporizer. The auxiliary or heating burner is arranged substantially parallel with the vaporizer and extends substantially the length of the latter, so that said vaporizer may be effectively heated to vaporize the kerosene or other like oil.

Provision is made for protecting the flame of the heating burner from down drafts of air, and provision is also made for protecting the vaporizer from the direct heat of the main burner.

These and other features of this invention will be pointed out in the claims at the end of this specification.

Figure 1 is an elevation of a hydrocarbon lamp provided with a burner embodying this invention. Fig. 2, a side elevation of the lamp shown in Fig. 1, looking toward the left, the casing or hood of the lamp being represented by dotted lines, and Fig. 3, a detail in section on an enlarged scale, the section being taken on the line 3—3, Fig. 2.

Referring to the drawings, $a$ represents a vaporizer tube which may be of any usual construction and substantially such as shown in U. S. Patent No. 654,669 dated July 31, 1900, the said tube being provided with an oil inlet $b$ and a vapor outlet in its end which is controlled by a needle valve $c$. The vaporizer $a$ is arranged in a substantially horizontal plane, and its discharge end extends into a substantially horizontal tube $d$, provided with air inlet pipes $e$ and constituting a mixing chamber for the vapor and air. The mixing chamber $d$ has communicating with it near its end, a main outlet pipe $f$ and an auxiliary outlet pipe $g$, which latter extends back substantially parallel with the mixing chamber and is provided at its rear end with an enlargement $h$ preferably substantially rectangular in cross section (see Fig. 3) and projected substantially close to the vaporizer $a$. The enlargement $h$ is provided with perforations forming vapor outlets, which extend longitudinally of the enlargement and are arranged with relation to the vaporizer $a$ so as to project the flame against said vaporizer. The enlarged perforated portion of the pipe $g$ constitutes a heating burner for the vaporizer $a$, and said burner extends substantially parallel with the vaporizer and for a considerable portion of its length, thereby enabling the vaporizer to be heated sufficiently to properly vaporize the kerosene or other like oil in the vaporizer without danger of excessively heating said vaporizer.

The main vapor outlet pipe $f$ for the mixing chamber as herein shown extends downward substantially at right angles to the mixing chamber and communicates with a main burner pipe $i$ which is provided in the present instance with two burners $j$ having mantles $k$, the said burners being located substantially in line with the air inlet pipes $e$ for the mixing chamber and to one side of the vaporizer, whereby the latter is removed from the heating zone of the main burner and the danger of excessive heating of the vaporizer is thereby avoided, while at the same time, the air passing through the pipes $e$ is highly heated.

The heating burner $h$ is located in the present instance above the vaporizer and the heating jet is protected from down drafts by a hood $m$, which extends substantially the length of the auxiliary burner $h$ and the pipe $g$, and may be secured at one end to an enlarged portion $n$ of the pipe $g$ and at its other end to a casting or end piece $o$ to which the heating burner is brazed or otherwise secured, and which is provided with a tubular boss $p$ extended through the hood or casing $q$ of the lamp and forming a support or bearing for the outer end of the vaporizer.

Below the vaporizer $a$ and substantially in close proximity thereto, is located a substantially concaved trough $r$ secured at one end to the casting $o$ and at its opposite end to the mixing chamber $d$. The trough $r$ may and preferably will be provided with an asbestos or other wick $s$ and is designed to contain alcohol for the purpose of initially heating the vaporizer. The alcohol trough serves also to shield the vaporizer from the heat ascending from the main burner.

The vaporizer $a$ is readily removed from the lamp when so desired, and is retained in its operative position by a pin 10 which engages a suitable slot not shown in the hollow boss $p$.

The needle valve $c$ is secured to a hub or sleeve 12 mounted to turn on an extension 13 of the vaporizer and provided with a disk or flange 14 constituting a handle for adjusting said needle valve. The needle valve is moved longitudinally when the sleeve 12 is turned, by a stud or pin 15 on the extension of the vaporizer tube engaging an inclined slot 16 in the sleeve.

The burner above described, is shown as embodied in a lamp of that class known as an arc lamp, which is provided with a globe 17 having an air inlet opening through a central boss 18, and provided at its upper end with a metal band or strap 19 which is hinged by an eye 20 to the hood or casing and is provided with an arm 21 which is detachably secured to the hood, by a key 22. The main burner tube $i$ is located substantially in line with the air inlet in the bottom of the globe and serves to baffle the current of air passing up into the globe, thereby diminishing the effect of the current of air on the heating jet.

It will be observed that the vaporizer $a$ is located out of the heating zone of the main burner, and as a result excessive heating of the vaporizer is avoided, thereby preventing or reducing to a minimum the formation of carbon deposits in the vaporizer, and enabling the latter to be used for a substantially long time without the necessity of cleaning the same, and increasing the efficiency of the lamp. The efficiency of the lamp is further increased by having the air inlet pipes for the mixing chamber located above and in line with the main burner, as the air is thus substantially highly heated before it is admixed with the vapor. The alcohol trough also serves to protect the vaporizer from the heat of the main burner.

In operation with the lamp herein shown, the kerosene admitted into the vaporizer $a$ is initially heated by burning the alcohol in the trough $r$. The vapor thus generated passes into the mixing chamber and is admixed with air therein. The gaseous mixture thus formed finds an exit from the mixing chamber in two paths, one through the pipe $f$ to the main burner, and the other through the pipe $g$ to the heating burner, and the gas is ignited at both burners by the alcohol flame. The heating jet is baffled by the vaporizer and heats the same for a very considerable portion of its length, thereby maintaining the vaporizer sufficiently heated to properly vaporize the kerosene or other like oil therein.

I have herein shown my invention as embodied in a hydrocarbon burner especially designed and adapted for use in a lamp, but I do not desire to limit my invention to the particular construction shown.

I claim:

1. In a hydrocarbon burner, in combination, a vaporizer, means to support said vaporizer in a substantially horizontal position, a mixing chamber substantially in line with said vaporizer and with which the latter communicates, said mixing chamber having an air inlet, a main burner located below said mixing chamber at one side of a substantially vertical plane through said vaporizer and substantially in a vertical plane with said air inlet, means to connect said main burner with said mixing chamber, an auxiliary burner communicating with said mixing chamber and extended substantially parallel with said vaporizer above the same, a deflector or shield above said auxiliary burner, and an alcohol cup below said vaporizer and interposed between said vaporizer and said main burner to shield the vaporizer from excessive heat from the main burner, substantially as described.

2. In a hydrocarbon burner, in combination, a vaporizer, means to support said vaporizer in a substantially horizontal position, a mixing chamber substantially in line with said vaporizer and with which the latter communicates, said mixing chamber having an air inlet, a main burner communicating with said mixing chamber and located below the mixing chamber in a plane substantially at right angles to said vaporizer and intersecting the same transversely, and an auxiliary burner communicating with said mixing chamber independent of the main burner and extended substantially parallel with said vaporizer above the main burner, substantially as described.

3. In a hydrocarbon burner, in combination, a mixing chamber closed at one end and open at its opposite end, a vaporizer having its discharge orifice communicating with the open end of said mixing chamber, said mixing chamber having an air inlet, a main burner, a pipe communicating with said main burner and extending from said mixing chamber near its closed end substantially at right angles thereto, an auxiliary burner substantially parallel with said vaporizer and communicating with said mixing chamber near its closed end, said auxiliary burner having gas outlet openings opposite said vaporizer, substantially as described.

4. In a hydrocarbon burner, in combination, a mixing chamber closed at its rear end and open at its front end, a vaporizer arranged in line with said mixing chamber and having its discharge orifice communicating with the open end of said mixing chamber, said mixing chamber having an air inlet, a main burner located below said mixing chamber, a pipe extended substantially at right angles to said mixing chamber and connecting it with the main burner, and an auxiliary burner communicating with said mixing chamber and extended substantially parallel with said mixing chamber and said vaporizer and having gas outlets arranged longitudinally of it and opposite to said vaporizer, substantially as described.

5. In a hydrocarbon burner, in combination, a mixing chamber closed at its rear end and open at its front end, a vaporizer arranged in line with said mixing chamber and having its discharge orifice communicating with the open end of said mixing chamber, said mixing chamber having an air inlet, a main burner located below said mixing chamber and communicating therewith, and an auxiliary burner communicating with said mixing chamber and extended substantially parallel with said mixing chamber and said vaporizer and having gas outlets arranged longitudinally of it and opposite to said vaporizer, and means interposed between said main burner and said vaporizer to protect the latter from excessive heat of the former, substantially as described.

6. In a hydrocarbon burner, in combination, a mixing chamber, a vaporizer substantially in line therewith and having its discharge orifice communicating with said mixing chamber, said mixing chamber having an air inlet, a main burner located below and communicating with said mixing chamber, a heating burner communicating with the mixing chamber and having vapor outlets opposite to said vaporizer, and a trough located below said vaporizer and extended in the direction of the length of the latter in substantially close proximity thereto, substantially as described.

7. The combination with a lamp provided with a hood and with a globe depending from said hood and having a substantially central air inlet in its bottom, of a hydrocarbon burner comprising a substantially horizontal vaporizer supported by said hood and extended into and outside of the same, a mixing chamber within the hood substantially in line with said vaporizer and with which the latter communicates, air inlet pipes for said mixing chamber extended through said hood substantially at right angles to said vaporizer, a pipe depending from said mixing chamber and extended into said globe, a main burner pipe attached to said depending pipe substantially in line with the air inlet in said globe to baffle the air admitted therein, and substantially in line with the air inlet pipes for the mixing chamber, a main burner attached to said main burner pipe, an auxiliary burner communicating with the mixing chamber and extended substantially parallel with the vaporizer above the same, substantially as described.

8. The combination with a lamp provided with a hood and with a globe depending from said hood and having a substantially central air inlet in its bottom, of a hydrocarbon burner comprising a substantially horizontal vaporizer supported by said hood and extended into and outside of the same, a mixing chamber within the hood substantially in line with said vaporizer and with which the latter communicates, air inlet pipes for said mixing chamber extended through said hood substantially at right angles to said vaporizer, a pipe depending from said mixing chamber and extended into said globe, a main burner pipe attached to said depending pipe substantially in line with the air inlet in said globe to baffle the air admitted therein, and substantially in line with the air inlet pipes for the mixing chamber, a main burner attached to said main burner pipe, an auxiliary burner communicating with the mixing chamber and extended substantially parallel with the vaporizer above the same, and a deflector above said auxiliary burner, substantially as described.

9. The combination with a lamp provided with a hood and with a globe depending from said hood and having a substantially central air inlet in its bottom, of a hydrocarbon burner comprising a substantially horizontal vaporizer supported by said hood and extended into and outside of the same, a mixing chamber within the hood substantially in line with said vaporizer and with which the latter communicates, air inlet pipes for said mixing chamber extended through said hood substantially at right angles to said vaporizer, a pipe depending from said mixing chamber and extended into said globe, a main burner pipe attached to said depending pipe substantially in line with the air inlet in said globe to baffle the air admitted therein, and substantially in line with the air inlet pipes for the mixing chamber, a main burner attached to said main burner pipe, an auxiliary burner communicating with the mixing chamber and extended substantially parallel with the vaporizer above the same, and means below said vaporizer to protect it from the direct heat of the main burner, substantially as described.

In testimony whereof, I have signed my name to this specification in the presence of two subscribing witnesses.

ALEXANDER O. BRADFORD.

Witnesses:
 JAS. H. CHURCHILL,
 J. MURPHY.